(12) United States Patent
Jinnai et al.

(10) Patent No.: US 7,351,042 B2
(45) Date of Patent: Apr. 1, 2008

(54) STRUCTURE OF SCROLL OF VARIABLE-THROAT EXHAUST TURBOCHARGER AND METHOD FOR MANUFACTURING THE TURBOCHARGER

(75) Inventors: Yasuaki Jinnai, Sagamihara (JP);
Hiroshi Nakagawa, Sagamihara (JP);
Takashi Mikogami, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 113 days.

(21) Appl. No.: 11/349,111

(22) Filed: Feb. 8, 2006

(65) Prior Publication Data

US 2006/0188368 A1 Aug. 24, 2006

(30) Foreign Application Priority Data

Feb. 10, 2005 (JP) ............................. 2005-033805

(51) Int. Cl.
*F02B 37/24* (2006.01)
*F01D 17/16* (2006.01)

(52) U.S. Cl. ................. 417/407; 60/602; 415/134; 415/163; 415/164

(58) Field of Classification Search ............. 415/134, 415/136, 138, 139, 159–165; 60/602; 417/407; 29/469, 888.01, 889.2, 889.22
See application file for complete search history.

(56) References Cited

U.S. PATENT DOCUMENTS 3,645,645 A * 2/1972 Gammill et al. ............ 415/163
4,679,984 A * 7/1987 Swihart et al. ............. 415/163
4,770,603 A * 9/1988 Engels et al. ............... 415/147
4,880,351 A * 11/1989 Inoue et al. ................. 415/164
5,146,752 A * 9/1992 Bruestle ...................... 60/602
6,256,991 B1 * 7/2001 Schmidt et al. .............. 60/602
6,543,994 B2 4/2003 Jinnai
6,736,595 B2 * 5/2004 Jinnai et al. ................ 415/164
6,916,153 B2 7/2005 Boening
2005/0252210 A1 * 11/2005 Shiraishi et al. ............. 60/602

FOREIGN PATENT DOCUMENTS

| JP | 2001-207858 | 8/2001 |
| JP | 2004-132367 | 4/2004 |
| JP | 2004-138005 | 5/2004 |

* cited by examiner

*Primary Examiner*—Christopher Verdier
(74) *Attorney, Agent, or Firm*—Wenderoth, Lind & Ponack, L.L.P.

(57) ABSTRACT

A ratio of cross sectional area A of a scroll passage to a scroll radius R (A/R) can be increased without increasing the size of a turbine casing and with very simple construction. An exhaust turbine capacity can thus be increased, so that a variable-throat exhaust turbocharger in which the engine output can be increased results. The turbocharger has a nozzle throat area varying mechanism of which a nozzle assembly unit is composed. A plurality of nozzle vanes are supported rotatably by an annular nozzle mount and an annular nozzle plate is connected to the nozzle mount by a plurality of nozzle supports to sandwich the nozzle vanes. The nozzle plate is located in the scroll chamber by attaching the nozzle assembly unit to the turbine casing to allow the nozzle plate to form part of the inside sidewall face of the scroll chamber and a wall face of the annular flow passage.

6 Claims, 8 Drawing Sheets

STRUCTURE OF SCROLL OF VARIABLE-THROAT EXHAUST TURBOCHARGER AND METHOD FOR MANUFACTURING THE TURBOCHARGER

BACKGROUND OF THE INVENTION

1. Field of the Invention

The present invention relates to the structure of the scroll of a variable-throat exhaust turbocharger equipped with a nozzle throat area varying mechanism (hereafter referred to as a variable-throat mechanism) and a method of manufacturing the turbocharger. The turbocharger is used for an internal combustion engine, the exhaust gas of the engine being introduced into the scroll chamber. The variable-throat mechanism is composed to vary the blade angle of a plurality of nozzle vanes disposed in an annular flow passage through which the exhaust gas enters the turbine rotor of the turbocharger to exert force to rotate the turbine rotor.

2. Description of the Related Art

In the field of relatively small exhaust turbochargers for internal combustion engines for vehicles, a radial flow type variable-throat exhaust turbocharger equipped with a variable-throat mechanism is widely used. Such a turbocharger is disclosed for example in JP2001-207858A, in which engine exhaust gas is introduced to the scroll chamber formed in the turbine casing to allow it to flow through an annular flow passage where a plurality of nozzle vanes are disposed so that the blade angle thereof can be varied, and the exhaust gas exerts forces to rotate the turbine rotor.

In the turbocharger of JP2001-207858A, the engine exhaust gas enters the scroll chamber of the turbine casing and flows through the space between the nozzle vanes to enter the exhaust turbine while flowing along the convolute passage of the scroll chamber in the turbine casing. The exhaust gas enters the turbine from the outer periphery side thereof to flow radially inwards, expands therein to transmit expansion work thereto and flows out from the turbine in the axial direction to be exhausted outside.

Controlling of the exhaust gas flow rate of the turbocharger is performed by determining a blade angle of the nozzle vanes so that the exhaust gas flow rate becomes a desired flow rate. Linear displacement of an actuator to correspond with the desired blade angle converts the displacement to rotation of the nozzle shaft by the medium of a drive ring, drive pins, and lever plates so that the nozzle vanes are rotated to be at the desired angle, and thus the blade angle is varied by the actuator.

Another example of a radial flow type variable-throat-exhaust turbocharger equipped with a variable-throat mechanism is disclosed in JP2004-132367A. A nozzle assembly of a variable-throat mechanism small in size, simple in construction, and easy to assemble.

In JP2004-138005A is disclosed a member, which contacts to another member and slides on it, and a member which faces another member with a very small clearance and has relative motion arising between the members, which are dipped in a solution of xylene or the like and micro carbon powder to have the surfaces of the members coated with dry carbon films. By this, the friction of sliding is reduced and an appropriate small clearance is always maintained.

In a radial flow type variable-throat exhaust turbocharger equipped with a variable-throat mechanism, cross sectional area A of the convolute passage of the scroll chamber and a scroll radius R (distance from the center of rotation of the turbine rotor to the center of cross sectional area A of the convolute passage) are important design factors. This A/R ratio is an important factor for determining aerodynamic performance and flow characteristic of the turbine. When it is intended to increase the A/R ratio, it is necessary to increase cross sectional area A or decrease scroll radius R.

With the exhaust turbine disclosed in JP2001-207858A, when it is intended to increase cross sectional area A of the convolute passage, the passage must be widened radially and axially, which results in an increased size of the turbine casing. Particularly, when the scroll chamber is widened radially outwardly, scroll radius R increases and the A/R ratio does not increase much.

When intending to decrease scroll radius R, it is needed to displace the scroll chamber radially inwardly, but it is difficult because there is, in the radially inner side of the scroll chamber, an annular flow passage in which the nozzle vanes are located.

Scroll radius R can be decreased by forming the scroll chamber more planar, but the scroll chamber must be extended in the axial direction and the turbine casing becomes rather large.

It is proposed to widen the scroll chamber largely axially inwardly to increase the A/R ratio, but in that case, manufacturing of the core for forming the scroll chamber when casting is more difficult and productivity is poor.

In JP2004-132367A is shown, in FIG. 1, a variable-throat exhaust turbocharger in which the annular disk/connecting ring 29 composes a part of the scroll chamber. However, the periphery of the disk/connecting ring 29 defines part of inner surface the scroll chamber and the cross sectional area of scroll passage area can not be increased without increasing the outer diameter or width of the turbine casing.

The invention disclosed in JP2004-138005A is very effective for reducing friction between sliding members or always maintaining an appropriate small clearance between members facing to each other with a small clearance. However, it is inevitable that the manufacturing cost increases due to the additional processing.

SUMMARY OF THE INVENTION

The object of the present invention is to provide a variable-throat exhaust turbocharger increased in exhaust turbine capacity by increasing the A/R, the ratio of cross sectional area A of a scroll passage to a scroll radius R, without increasing the size of the turbine casing and with very simple construction. The turbocharger can then be increased in efficiency and the engine output can be increased.

To attain the object, the present invention proposes a scroll structure of a variable-throat exhaust turbocharger equipped with a variable-throat mechanism for varying the blade angle of a plurality of nozzle vanes arranged in an annular flow passage formed on the inner side of a scroll chamber of a turbine casing whereby engine exhaust gas is introduced to the scroll chamber to pass through the annular flow passage to flow into a radial flow type turbine. A nozzle assembly unit of the variable-throat mechanism is composed such that a plurality of nozzle vanes are supported rotatably by an annular nozzle mount. An annular nozzle plate is connected to the nozzle mount by means of a plurality of nozzle supports to sandwich the nozzle vanes. The nozzle assembly unit is attached detachably in the turbine casing. The nozzle plate is located in the scroll chamber by attaching the nozzle assembly unit to the turbine casing to allow the nozzle plate to form an inside sidewall face of the scroll chamber and a wall face of the annular flow passage.

In the variable-throat exhaust turbocharger, it is preferable that a seal member is provided between the nozzle plate and turbine casing for sealing against gas leakage between the scroll chamber and the downstream side of the annular flow passage.

The invention also proposes a method of manufacturing a variable-throat exhaust turbocharger equipped with a nozzle throat area varying mechanism for varying the blade angle of a plurality of nozzle vanes arranged in an annular flow passage formed in the inner side of a scroll chamber of a turbine casing whereby engine exhaust gas is introduced to the scroll chamber to pass through the annular flow passage to flow into a radial flow type turbine. The method has a step of manufacturing a cartridge-like nozzle assembly unit which is composed such that a plurality of nozzle vanes are supported rotatably by an annular nozzle mount and an annular nozzle plate is connected to the nozzle mount by means of a plurality of nozzle supports to sandwich the nozzle vanes. A seal member is fitted to a supporting portion of the turbine casing where the inner surface of the annular nozzle plate is to be fitted for sealing against gas leakage between the scroll chamber and the downstream side of the annular flow passage. The cartridge-like nozzle assembly unit is attached to the turbine casing so that the nozzle plate forms an inside sidewall face of the scroll chamber and a wall face of the annular flow passage.

According to the invention, the nozzle plate of the variable-throat mechanism is located in the scroll chamber so that the nozzle plate forms an inside sidewall face of the scroll chamber, so the part of the turbine casing for accommodating the nozzle plate becomes unnecessary. The A/R, the ratio of cross sectional area A of scroll passage to scroll radius R, can then be increased without increasing the size of the turbine casing.

By this, capacity of the exhaust turbine can be increased by increasing the cross sectional area A of scroll chamber without increasing the size of the turbocharger, so turbocharging approaches nearer to constant-pressure turbocharging and the turbocharging efficiency is increased.

Further, as the turbine casing itself is decreased in weight, and in addition, the inside profile of the scroll chamber in the turbine casing becomes simple, the profile of the core for forming the scroll chamber when casting the turbine casing becomes simple and productivity of the turbine casing is increased.

Exhaust gas leakage is feared to occur from the mating portion of the nozzle plate with the turbine casing by allowing the nozzle plate to compose part of the inside profile of the scroll chamber. This is dismissed by providing the seal ring between the nozzle plate and turbine casing. The seal ring performs sealing between the scroll chamber and the downstream passage of the annular flow passage.

In the invention, it is preferable that each of the nozzle supports is fitted loosely into each of through-holes, which are arranged circumferentially in the nozzle plate, with a certain clearance between the outer circumference of the end shaft part of the nozzle support and the inner circumference of the through-hole.

With this composition, as the nozzle support is connected to the nozzle plate with a certain clearance between the through-hole in the nozzle plate and the outer surface of the end part of the nozzle support, even when differences in temperature occur between the nozzle mount and the nozzle plate, and the centers of the nozzle supports fixed to the nozzle mount and those of the through holes to receive the nozzle supports become out of alignment, the shifts of centers can be absorbed by the clearance, so that the occurrence of unreasonable stress is prevented.

Further, in the invention, it is preferable that a corner of the periphery of the nozzle plate is either tapered or rounded toward the entrance of the annular flow passage to form a guide portion for smooth entrance of the exhaust gas in the scroll chamber to the annular flow passage.

With this configuration of the nozzle plate, a tapered portion or rounded portion is formed at the periphery of the nozzle plate facing the entrance of the annular flow passage so that exhaust gas introducing portion is formed by which exhaust gas flow area is smoothly decreased from the scroll chamber to the annular flow passage at the entrance thereof. The entrance loss of head of the exhaust gas in the scroll chamber to the annular flow passage is thus decreased and aerodynamic performance is improved, resulting in increased efficiency of the turbine.

In the invention, it is preferable that the nozzle plate is formed such that the rear face thereof facing the scroll chamber is a curved surface of revolution smoothly continuing to the inside circular surface of the scroll chamber. With this configuration of the nozzle plate, the scroll chamber side face of the nozzle plate can be formed to match ideally with the flow of exhaust gas in the scroll chamber, so the degree of freedom in designing the profile of the scroll chamber is increased, aerodynamic performance is improved and turbine efficiency can be increased.

Further, when it is needed to increase the thickness of the nozzle plate for securing the strength thereof to meet high thermal stress due to uneven temperature distribution of the nozzle plate, the nozzle plate can be formed thick while utilizing part of it for defining part of the inside profile of the scroll chamber without reducing the space for the scroll chamber. Therefore, securing the strength of the nozzle plate as well as simplification of the turbine casing can be attained.

In the invention, it is preferable that the nozzle plate is shaped such that its outer periphery part is bent so that the part facing the inlet of the annular flow passage is formed into a curved surface whereby the annular flow passage is reduced smoothly at the entrance thereof. Thus, a guide part is formed to smoothly introduce the exhaust gas in the scroll chamber.

With this configuration of the nozzle plate, the entrance to the annular passage is formed like a semi-bell mouth, and the curved surface can be formed easily by machining, press work, or forging.

As the curvature radius of the guide portion can be made fairly large, the entrance head loss is decreased and aerodynamic performance is increased, resulting in increased turbine efficiency.

It is preferable that the nozzle plate is formed to have a cylindrical part extending parallel to the rotation center line of the turbine rotor and an annular plate part perpendicular to the cylindrical part and continuing thereto. An annular flow passage is formed between the nozzle mount and the annular plate part of the nozzle plate. The inside periphery of the cylindrical part is continued to the annular flow passage side surface of the annular plate part with a curved surface to shroud the curved peripheries of the turbine blades extending from the inlet to the outlet of the turbine.

It is preferable in the invention that the cylindrical part of the nozzle plate is connected to the turbine casing by socket and spigot jointing at the end thereof to the turbine casing whereby the outer surface of the cylindrical part of the nozzle plate forms part of the inside circular surface of the scroll chamber.

According to the invention, as the nozzle plate is shaped as described above such that the cylindrical part of the nozzle plate extends in the axial direction of the turbine rotor and the annular plate part of the nozzle plate forms part of the inside sidewall face of the scroll chamber and a wall face of the annular flow passage, the thickness of the cylindrical part which constitutes the shroud part of the turbine can be reduced by making the nozzle plate of ductile material of high strength in high temperature such as austenite type stainless steel compared to prior art in which the shrouding part is formed by the cast material of the turbine casing.

By this, the turbine casing can be reduced in size without reducing the cross sectional area A of scroll passage. When intending to increase the outlet diameter of the turbine, the inside diameter of the shroud part can be increased without reducing the cross sectional area A of scroll passage. Thus, by allowing the nozzle plate to function also as the shroud of the turbine blades and exhaust passage, the scroll part of the turbine casing is simplified, the shape of the core for forming the scroll chamber when casting the turbine casing is simplified, and the weight of the turbine casing can be reduced.

The end of the cylindrical part is fitted to a counter bore of the turbine casing with a clearance between the end face of the cylindrical part and the end face of the counter bore of the turbine casing. The axial shift of the nozzle plate due to thermal expansion of the nozzle assembly unit can be allowed by the clearance.

According to the invention, the nozzle plate of the variable-throat mechanism is located in the scroll chamber so that the nozzle plate forms an inside sidewall face of the scroll chamber. So the part of the turbine casing for accommodating the nozzle plate becomes unnecessary, and the A/R, the ratio of cross sectional area A of scroll passage to scroll radius R, can be increased without increasing the size of the turbine casing.

By this, the capacity of the exhaust turbine can be increased by increasing the cross sectional area A of scroll chamber without increasing the size of the turbocharger. Turbocharging approaches nearer to constant-pressure turbocharging, turbocharging efficiency is increased and engine performance can be improved.

Further, the profile of the scroll chamber to be formed in the turbine casing which is molded by casting is simplified, so the shape of the core for forming the scroll chamber by casting is simplified, in addition to that the turbine casing is decreased in weight, and productivity of the turbocharger can be increased.

According to the invention in which the cylindrical part of the nozzle plate extends in the axial direction of the turbine rotor and the annular plate part of the nozzle plate constitutes a wall to form the annular flow passage, the nozzle plate can be made of ductile material of high strength in high temperature and the thickness of the cylindrical part functioning as the turbine outlet shroud can be reduced.

By this, the turbine casing can be reduced in size, and the inside diameter of the shroud part can be increased without reducing the cross sectional area A of scroll passage. Thus, by allowing the nozzle plate to function also as the shroud of the turbine blades and exhaust passage, the scroll part of the turbine casing is simplified, the shape of the core for forming the scroll chamber when casting is simplified, and the weight of the turbine casing can be reduced.

BRIEF DESCRIPTION OF THE DRAWINGS

FIG. 2 are representations showing connection of the nozzle plate and nozzle supports of the first embodiment, in which

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 8:
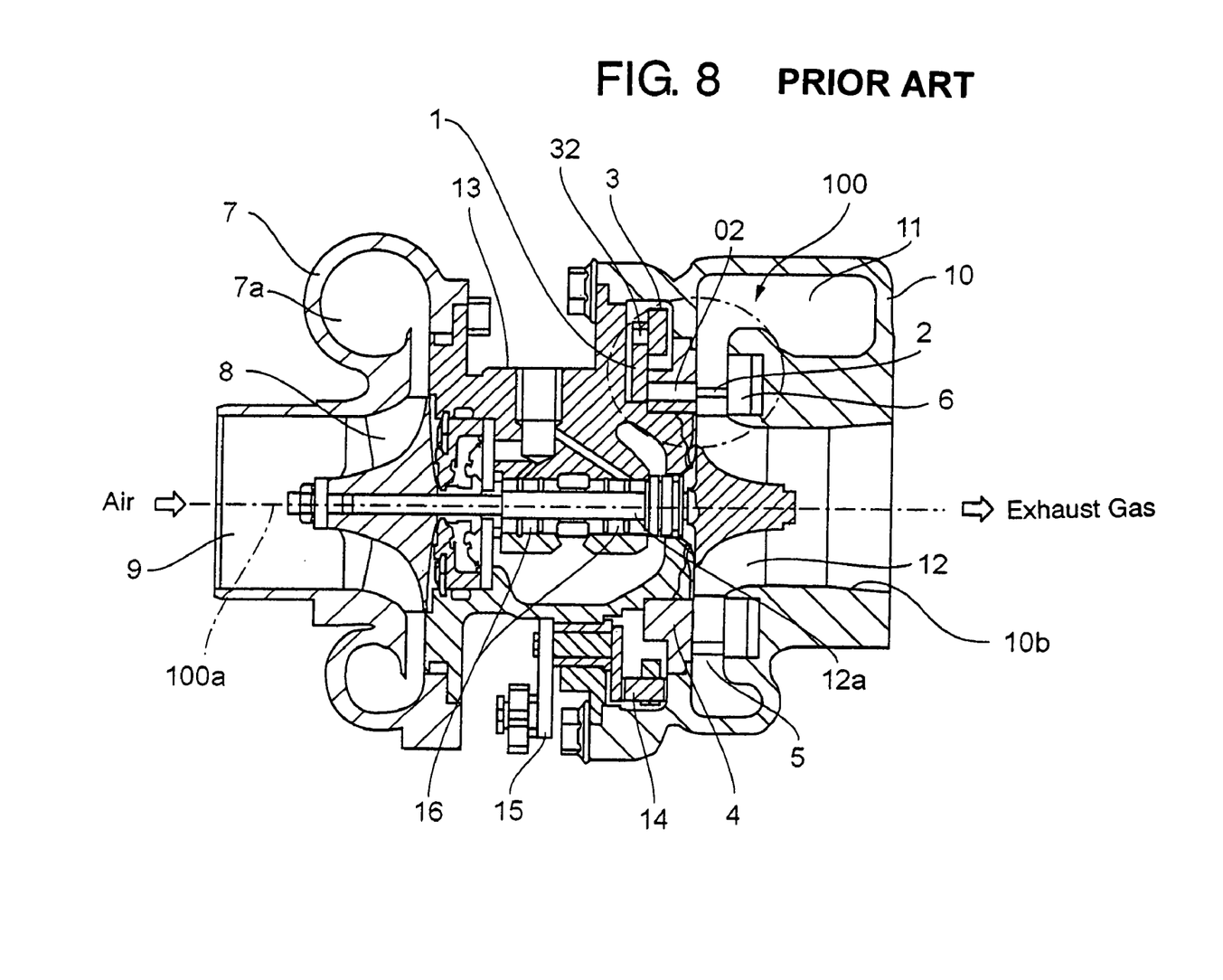
FIG. 8 is a longitudinal sectional view of a conventional variable-throat exhaust turbocharger equipped with a variable-throat mechanism to which the present invention is applied.

FIG. 8 is a longitudinal sectional view of a conventional variable-throat exhaust turbocharger equipped with a variable-throat mechanism to which the present invention is applied.

In FIG. 8, reference numeral 10 is a turbine casing and 11 is a scroll chamber formed inside the turbine casing 10. Reference numeral 12 is a turbine rotor of radial flow type, which is connected to a compressor wheel 8 coaxially and of which a turbine shaft 12a is supported for rotation by a bearing housing 13 by means of bearings 16. Reference numeral 7 is a compressor housing accommodating the compressor 8, 9 is an air inlet of the compressor housing 7, and 7a is a convolute air passage (scroll passage).

Reference numeral 100a shows the center of rotation of the exhaust turbocharger.

Reference numeral 2 is a nozzle vane. Plural nozzle vanes are arranged circumferentially equally spaced in an annular flow passage for exhaust gas formed on the inner side of the scroll chamber 11. A nozzle shaft 02 of each of the nozzle vanes is supported rotatably by a nozzle mount 4 fixed to the turbine casing 10 so that the blade angle of the nozzle vane 2 can be varied by means of a variable-throat mechanism 100.

In the variable-throat mechanism 100, the nozzle vanes are arranged in the annular flow passage formed between the nozzle mount 4 and the annular shaped nozzle plate 6 which is connected to the nozzle mount 4 by means of a plurality of nozzle supports 5. The nozzle plate 6 is received in an annular recess provided in the turbine casing 10 for supporting the nozzle plate 6.

Reference numeral 3 is a drive ring formed into an annular plate and supported rotatably on a part of the periphery of the nozzle mount 4. A plurality of drive pins 32 are fixed to the drive ring 3 circumferentially equally spaced. Reference numeral 1 references lever plates, each of which is engaged with one of the drive pins 32. A groove provided on the input side (outer side end part) thereof is engaged with the drive pin 32 and the nozzle shaft 02 is fixed to the output side (center side end part) thereof.

Reference numeral 15 is a link connected to an actuator (not shown) to drive the nozzle vanes 2, and 14 is a pin connected to the link 15. The pin 14 is engaged with the drive ring 3 to rotate the drive ring 3.

In the variable-throat exhaust turbocharger with the variable throat-area mechanism, exhaust gas of an internal combustion engine (not shown) enters the scroll chamber 11 and then the annular flow passage while swirling along the convolution of the scroll chamber 11. The exhaust gas flows through the spaces between the nozzle vanes to enter the turbine rotor 12 from the periphery thereof to flow in the radial direction toward the center and flows out in the axial direction while exerting expansion work upon the turbine rotor 12. Then, the exhaust gas flowing out from the turbine rotor flows through the outlet passage 10b of the turbine casing and is exhausted outside.

When controlling exhaust gas flow through the exhaust turbine, the blade angle of the nozzle vanes 2 is determined by a blade angle control means (not shown) so that the flow rate of the exhaust gas flowing through the spaces between the nozzle vanes is a desired flow rate. The actuator (not shown) rotates the drive ring 3 to rotate the nozzle vanes 2 to the angle determined by the blade angle control means by way of the link 15 and pin 14.

When the drive ring 3 is rotated, each lever plate 1 is swung around the center axis of each nozzle shaft 02, which is supported rotatably in the nozzle mount, by each of the drive pins 32, fixed to the drive ring 3 to be circumferentially equally spaced, by which each nozzle shaft 02 fixed to each lever plate is rotated and each nozzle vane 2, integral with each nozzle shaft 02 is rotated. Thus, the blade angle of the nozzle vanes is varied.

The present invention relates to an improvement of the structure of scroll of a variable-throat exhaust turbocharger equipped with the variable throat-area mechanism 100 composed as described above.

First Embodiment

Figure 1A:
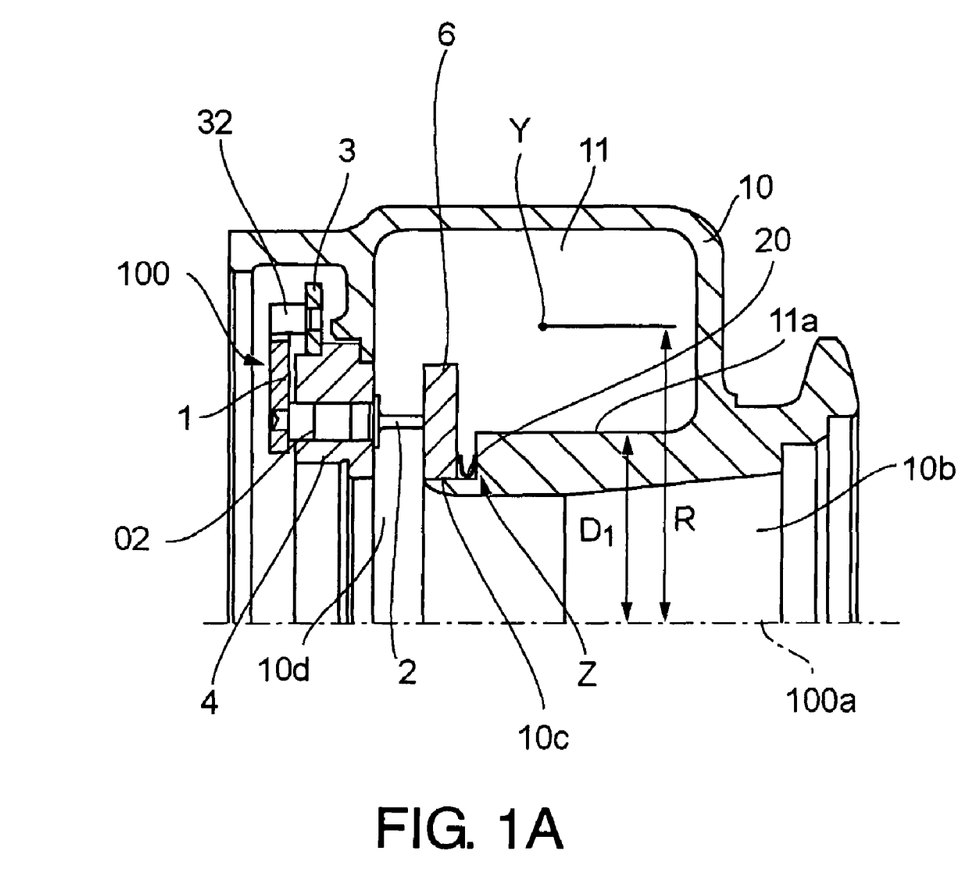
FIG. 1A is a longitudinal sectional view of a relevant part of a variable-throat exhaust turbocharger equipped with a variable-throat mechanism of a first embodiment according to the present invention and FIG. 1B is an enlarged detail of FIG. 1A.
Figure 2A:
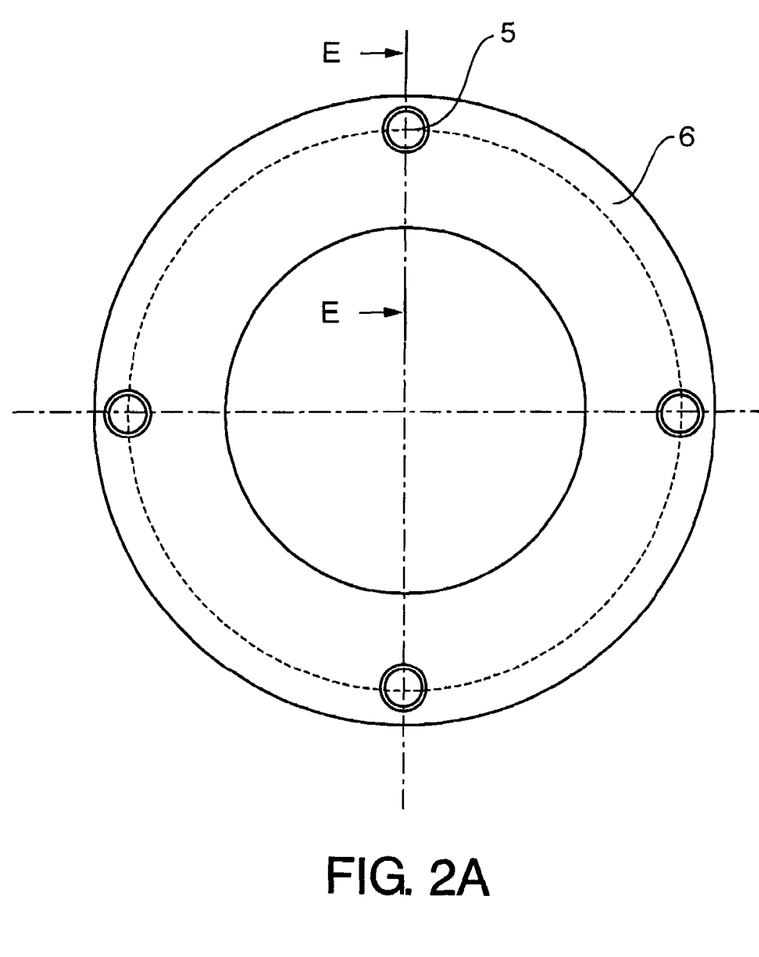
FIG. 2A is a front view and FIG. 2B is a sectional view taken along line E-E in FIG. 2A.
Figure 2B:
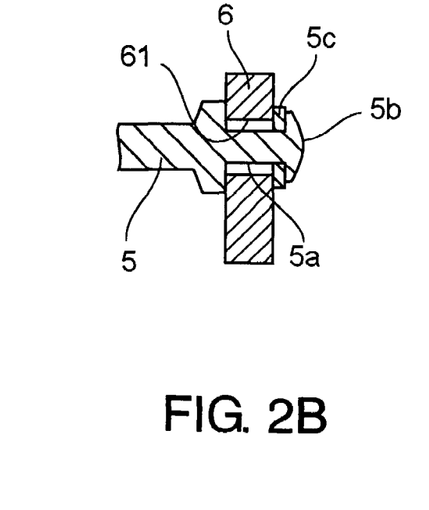

FIG. 1A is a longitudinal sectional view of relevant part of a variable-throat exhaust turbocharger equipped with a variable-throat mechanism of the first embodiment according to the present invention, and FIG. 2A and FIG. 2B are representations showing connection of the nozzle plate and nozzle supports of the first embodiment, FIG. 2A is a front view, and FIG. 2B is a sectional view taken along line E-E in FIG. 2A.

Referring to FIG. 1A, reference numeral 10 is a turbine casing and 11 is a scroll chamber formed inside the turbine casing 10. Reference numeral 100a is the center of rotation of the exhaust turbocharger, the turbine rotor 12 of which (see FIG. 8) is omitted in the drawing.

Reference numeral 2 is a nozzle vane. Plural nozzle vanes are arranged circumferentially equally spaced in an annular flow passage formed on the inner side of the scroll chamber 11. A nozzle shaft 02 of each of the nozzle vanes is supported rotatably by a nozzle mount 4 fixed to the turbine casing 10 so that the blade angle of the nozzle vane 2 can be varied by means of a variable-throat mechanism.

In the variable-throat mechanism 100, a nozzle assembly unit is constructed as a cartridge, in which the nozzle vanes 2 supported rotatably to the nozzle mount 4 by the medium of the nozzle shaft 02, are arranged in the annular flow passage formed between the nozzle mount 4 and an annular shaped nozzle plate 6 connected to the nozzle mount 4 by the medium of a plurality of nozzle supports 5. The nozzle mount 4 of the nozzle assembly unit is connected to the turbine casing 10 by bolts not shown in the drawing. The inner periphery of the annular nozzle plate 6 is fit to an outer periphery 10c of a supporting portion provided at an end of a circular wall forming the inside wall of the scroll chamber 11, thus the nozzle assembly is detachably incorporated as an assembled unit to the turbine casing.

In this way, the nozzle plate 6 of the variable-throat mechanism 100 is positioned in the scroll chamber 11 to form a part of the inside sidewall of the scroll chamber 11 so that the inside profile of the scroll chamber 11 is defined by the inside surface 11a (of diameter of D1) and the scroll chamber side face of the nozzle plate 6.

In FIG. 1A, symbol Y indicates the center of cross sectional area of the scroll passage and R indicates scroll radius, the distance from the center of rotation 100a.

Figure 1B:
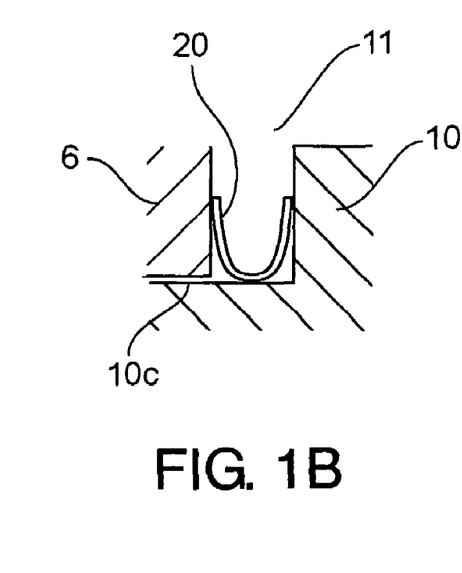

As shown in FIG. 1B, a seal ring 20 is received in a circular groove formed by a side face of the nozzle ring 6, a part of the periphery 10c, and a shoulder face of a stepped part of the inside wall of diameter of D1. Sealing between the scroll chamber and the downstream side passage of the annular flow passage is done by the seal ring 20.

Now, referring to FIG. 2A and FIG. 2B, a plurality of nozzle supports 5 (four supports in this example) are connected to the nozzle plate 6 such that an end part 5a of each of the nozzle supports 5 is fitted loosely into each of through-holes 61 drilled in the nozzle plate 6 to be circumferentially equally spaced. A certain clearance is between the outer circumference of the end part 5a of the nozzle shaft 5 and the inner circumference of the through-hole 61. The end of each of the nozzle supports 5 is caulked with a washer 5c placed behind the nozzle plate (caulking is indicated by 5b).

With this composition, as the nozzle support 5 is connected to the nozzle plate 6 with a certain clearance between the through-hole 61 in the nozzle plate 6 and the end part 5a of the nozzle support 5, even when a difference in temperature occurs between the nozzle mount 4 and nozzle plate 6 and the centers of the nozzle supports 5 fixed to the nozzle mount 4 and those of the through holes to receive the nozzle supports 5 become out of alignment, the shift of centers can be absorbed by the clearance. The occurrence of unreasonable stress is thereby prevented.

When manufacturing the variable-throat exhaust turbocharger composed as described above, a nozzle assembly unit constructed as a cartridge, is manufactured to be composed such that a plurality of nozzle vanes 2 are supported rotatably by the nozzle mount 4 of annular shape by the medium of nozzle shafts, and the nozzle vanes are arranged between the nozzle mount 4 and the nozzle plate 6 of annular shape connected to the nozzle mount 4 by the medium of a plurality of nozzle supports 5 (see FIG. 8).

Then, the nozzle assembly unit, like a cartridge, is attached to the turbine casing 10 so that the nozzle plate 6 is positioned in the scroll chamber 11 and forms a part of the inside sidewall face of the scroll chamber 11.

Before attaching the nozzle assembly, the seal ring 20 is placed on the outer periphery 10c of the supporting portion at the end of the circular wall forming the inside wall of the scroll chamber 11 so that the seal ring 20 is held between the side face of the nozzle plate 6 and the shoulder face of the stepped part. The seal ring 20 performs sealing between the scroll chamber 11 and the downstream side passage 10d of the annular flow passage.

According to the first embodiment, as the inside wall face of the scroll chamber 11 is defined by the inside surface 11a and a surface of the nozzle plate 6 by positioning the nozzle plate 6 of the variable-throat mechanism 100 in the scroll chamber 11, part of the circular inside wall of the scroll chamber surrounding the nozzle plate 6 as seen in FIG. 8 on a conventional turbocharger becomes unnecessary. Therefore, the cross sectional area A of the scroll passage can be increased without increasing the scroll chamber outwardly, and the A/R ratio of the scroll chamber can be increased.

By this, the capacity of the exhaust turbine can be increased by increasing the cross sectional area A of scroll chamber without increasing the size of the turbocharger. Turbocharging then approaches nearer to constant-pressure turbocharging, the turbocharging efficiency is increased and the engine performance can be improved.

Further, as the part of the circular inside wall of the turbine casing 10 surrounding the nozzle plate is eliminated, the turbine casing itself is decreased in weight. In addition to this, the inside profile of the turbine casing 10 becomes simple, so the profile of the core for forming the scroll chamber when casting the turbine casing becomes simple, and the productivity of the turbine casing is increased.

As to exhaust gas leakage feared to occur from the mating portion of the nozzle plate with the turbine casing 10 by allowing the nozzle plate 6 to compose part of the inside sidewall of the scroll chamber 11, it is dismissed by providing the seal ring 20 between the nozzle plate 6 and turbine casing 10. The seal ring 20 performs sealing between the scroll chamber 11 and the downstream side passage 10d of the annular flow passage.

Second Embodiment

Figure 3:
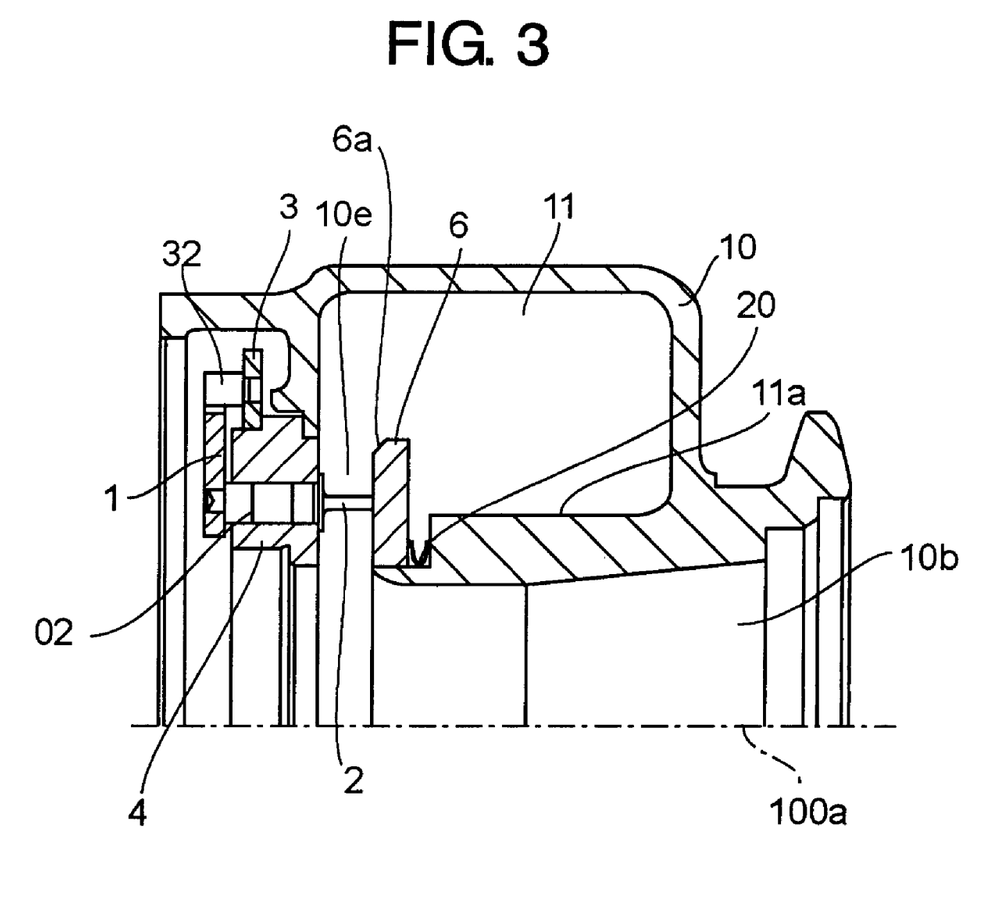
FIG. 3 is a drawing of a second embodiment corresponding to FIG. 1.

FIG. 3 is a drawing of a second embodiment corresponding to FIG. 1.

In the second embodiment, the periphery of the nozzle plate 6 is tapered toward the entrance of the annular flow passage 10e where the nozzle vanes 2 are arranged. By this, an exhaust gas guide portion 6a is formed by which the exhaust gas flow area is smoothly decreased from the scroll chamber 11 to the annular flow passage 10e at the entrance thereof.

The configuration other than that is the same as that of the first embodiment, and parts the same as the first embodiment are designated by the same reference numerals.

Third Embodiment

Figure 4:
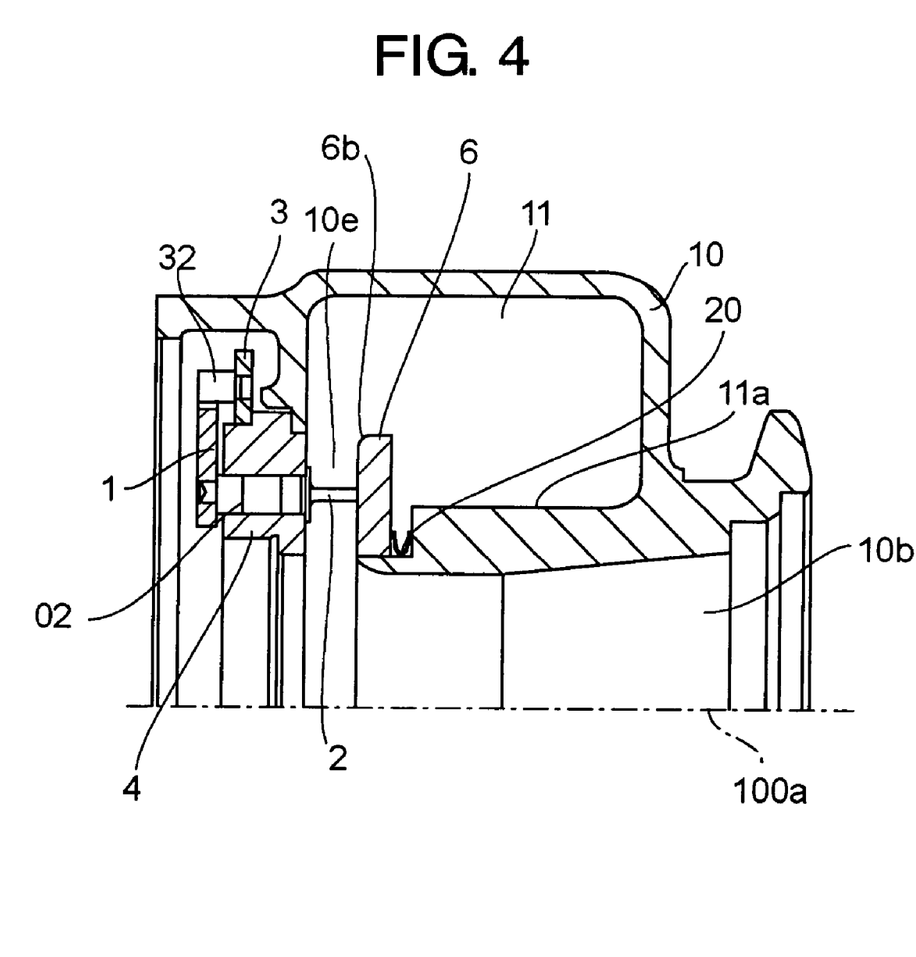
FIG. 4 is a drawing of a third embodiment corresponding to FIG. 1.

FIG. 4 is a drawing of the third embodiment corresponding to FIG. 1.

In the third embodiment, the periphery of the nozzle plate 6 is rounded facing the entrance of the annular flow passage 10e where the nozzle vanes 2 are arranged. By this, an exhaust gas guide portion 6b is formed by which exhaust gas flow area is smoothly decreased from the scroll chamber 11 to the annular flow passage 10e at the entrance thereof.

The configuration other than that is the same as that of the first embodiment and parts the same as the first embodiment are designated by the same reference numerals.

According to the second and third embodiments, by providing a tapered portion (in the second embodiment) or rounded portion (in the third embodiment) at the periphery of the nozzle plate 6 to face the entrance of the annular flow passage 10e so that exhaust gas guide portion 6a (in the second embodiment) or 6b (in the third embodiment) is formed by which exhaust gas flow area is smoothly decreased from the scroll chamber 11 to the annular flow passage 10e at the entrance thereof, loss of head at the entrance from the scroll chamber to the annular flow passage is decreased and aerodynamic performance is improved, resulting in increased efficiency of the turbine.

Fourth Embodiment

Figure 5:
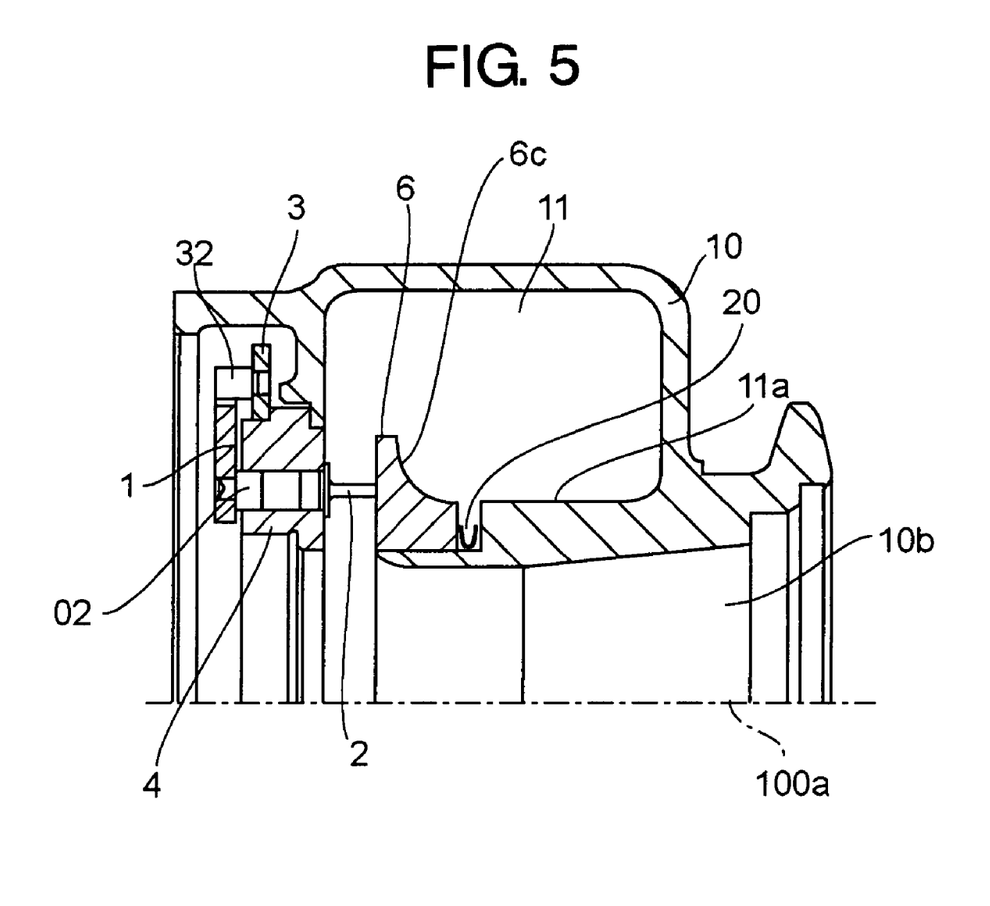
FIG. 5 is a drawing of a fourth embodiment corresponding to FIG. 1.

FIG. 5 is a drawing of the fourth embodiment corresponding to FIG. 1.

In the fourth embodiment, the nozzle plate 6 is formed such that the rear face thereof facing the scroll chamber 11 is a curved surface of revolution 6c smoothly continuing to the inside circular surface 11a of the scroll chamber 11.

According to the fourth embodiment, as the scroll chamber side face of the nozzle plate 6 can be formed to match ideally for the flow of exhaust gas in the scroll chamber, the degree of freedom in designing the profile of the scroll chamber is increased, aerodynamic performance is improved and turbine efficiency can be increased.

Further, when it is needed to increase the thickness of the nozzle plate 6 for securing the strength thereof to meet high thermal stress demands due to uneven temperature distribution of the nozzle plate 6, the nozzle plate 6 can be formed thick while utilizing part of it for defining part of the inside profile of the scroll chamber without reducing the space for the scroll chamber. Therefore, securing the strength of the nozzle plate, as well as simplification of the turbine casing, can be attained.

The configuration other than that is the same as that of the first embodiment and parts same to the first embodiment are designated by the same reference numerals.

Fifth Embodiment

Figure 6:
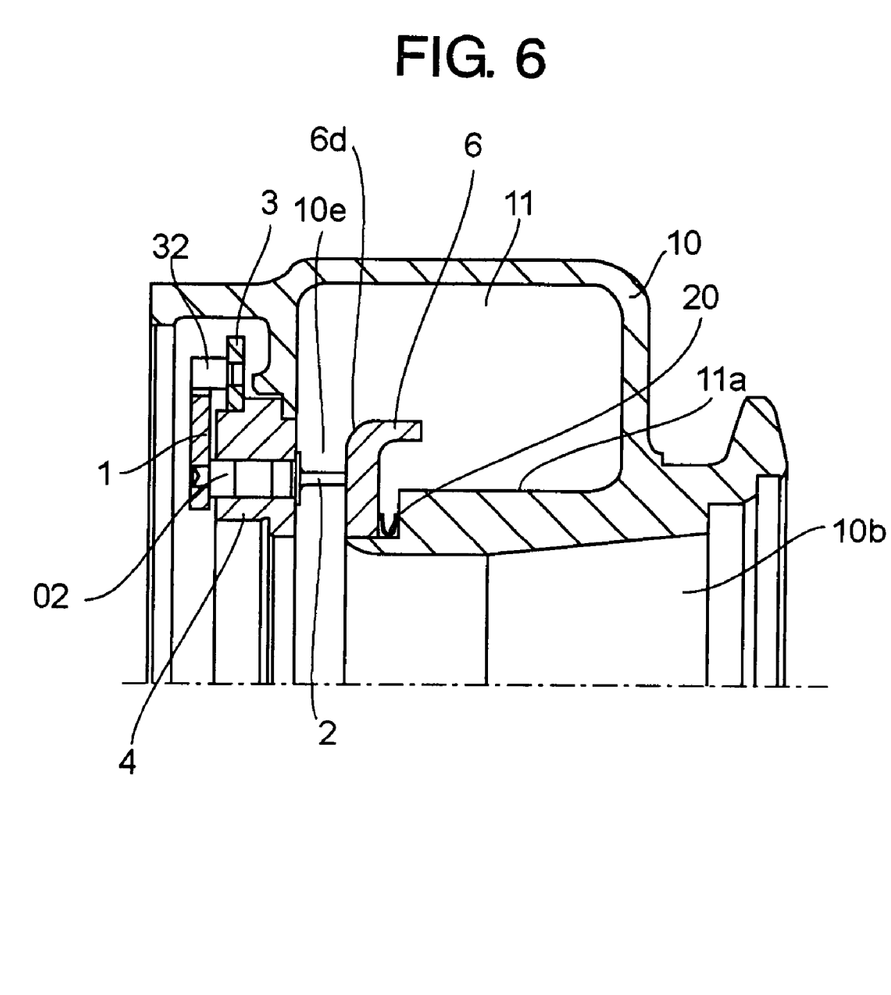
FIG. 6 is a drawing of a fifth embodiment corresponding to FIG. 1.

FIG. 6 is a drawing of a fifth embodiment corresponding to FIG. 1.

In the fifth embodiment, the nozzle plate 6 is shaped such that its periphery part is bent so that the part facing the inlet of the annular flow passage 10e is formed into a curved surface by which the annular flow passage 10e is reduced smoothly at the entrance thereof. Thus a guide portion 6d is formed to smoothly introduce the exhaust gas in the scroll chamber.

According to the fifth embodiment, the entrance to the annular passage 10e is formed like a semi-bell mouth and the curved surface can be formed easily by machining, press work, or forging. The curvature radius of the guide portion 6d can be made fairly large, so the entrance head loss is decreased and aerodynamic performance is increased resulting in increased turbine efficiency.

The configuration other than that is the same as that of the first embodiment and parts the same as the first embodiment are designated by the same reference numerals.

Sixth Embodiment

Figure 7:
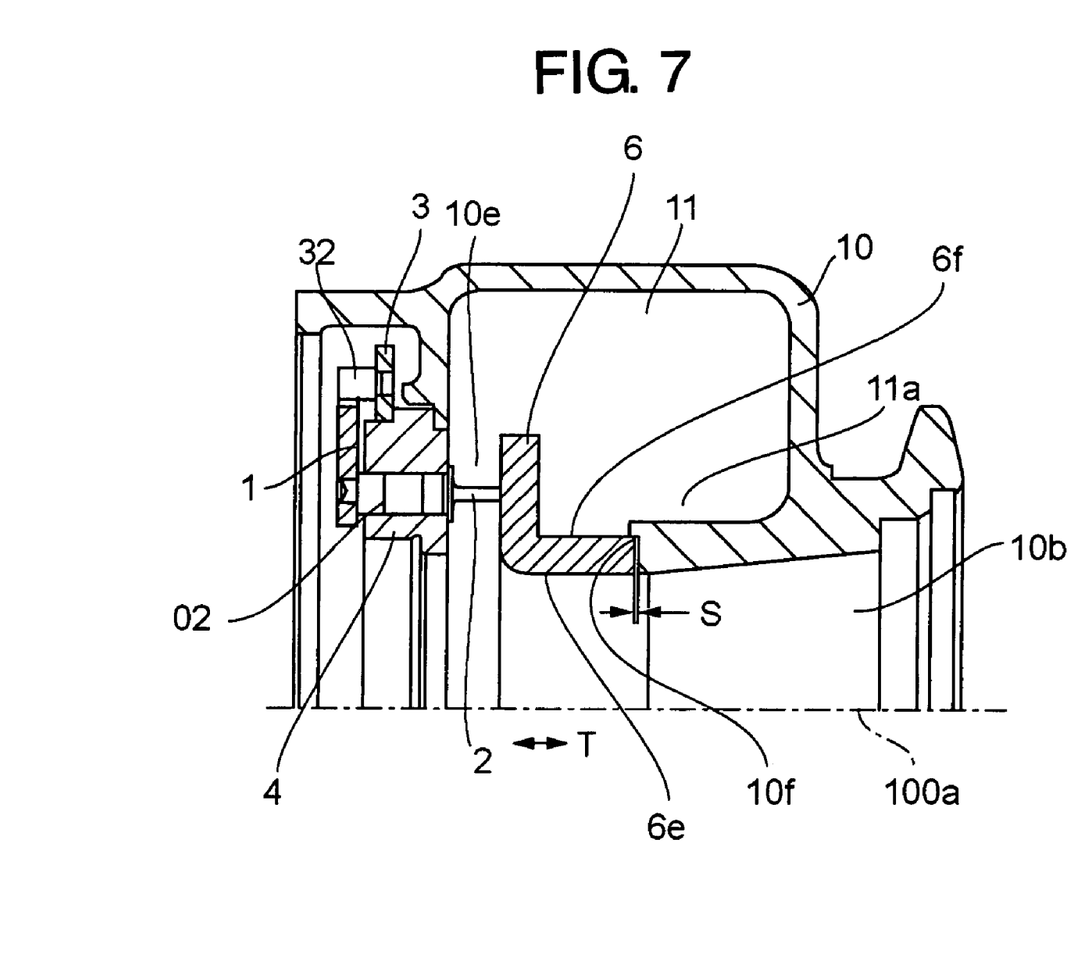
FIG. 7 is a drawing of a sixth embodiment corresponding to FIG. 1.

FIG. 7 is a drawing of a sixth embodiment corresponding to FIG. 1.

According to the sixth embodiment, the nozzle plate 6 is formed to have a cylindrical part extending parallel to the rotation center line 100a of the turbine rotor 12 (see FIG. 8) and an annular plate part perpendicular to the cylindrical part and continuing thereto. An annular flow passage 10e is formed between the nozzle mount 4 and the annular plate part of the nozzle plate 6. The inside periphery of the cylindrical part is continued to the annular flow passage side surface of the annular plate part with a curved surface to shroud the curved peripheries of the turbine blades extending from the inlet to the outlet of the turbine. The outside periphery can form an inner surface 6f of the scroll chamber 11.

Thus, a shrouding surface 6e of the turbine for shrouding curved peripheries of turbine blades and the periphery of exhaust passage to introduce exhaust gas to the exhaust opening of the turbine is formed by the nozzle plate 6.

In the sixth embodiment, the end of the cylindrical part of the nozzle plate 6 is connected to the turbine casing 10 by a socket and spigot jointing and the annular plate part of the nozzle plate 6 is connected concentrically and rigidly to the nozzle mount 4 by the medium of the nozzle supports 5 not loose fit connection as shown in FIG. 2(B).

According to the sixth embodiment, as the nozzle plate 6 is formed such that the longitudinal section has the general shape of a letter "L" consisting of a vertical (radial) part (annular plate part) and a horizontal (axial) part (cylindrical part) with the vertical part facing the annular flow passage and the horizontal part extending along the rotation axis 100a of the turbine rotor 12 to form the shroud of the turbine blades and exhaust passage, the thickness of the horizontal part can be reduced by making the nozzle plate 6 of ductile material of high strength in high temperature such as austenite type stainless steel compared to the case the shrouding part of the turbine blades and exhaust passage is formed as part of the turbine casing 10 molded by casting in prior art.

By this, the turbine casing 10 can be reduced in size, and when intending to increase the outlet diameter of the turbine the inside diameter of the shrouding face 6e can be increased without reducing the cross sectional area A of scroll passage. Thus, by allowing the nozzle plate 6 to function also as the shroud of the turbine blades and exhaust passage, the scroll part of the turbine casing 10 is simplified, the shape of core for forming the scroll chamber 11 when casting the turbine casing is simplified, and the weight of the turbine casing 10 can be reduced.

The axial shift of the nozzle plate due to thermal expansion of the nozzle assembly unit can be allowed by a clearance S between the end face of horizontal part of the nozzle plate and the end face of the socket part of the turbine casing.

The configuration other than that is the same as that of the first embodiment and parts same to the first embodiment are designated by the same reference numerals.

According to the present invention, A/R, the ratio of cross sectional area A of scroll passage to scroll radius R, can be increased without increasing the size of the turbine casing and with a very simple construction, the exhaust turbine capacity can be increased, and thus a variable-throat exhaust turbocharger of increased efficiency with which the engine output can be increased can be provided.

What is claimed:

1. A scroll structure of a variable-throat turbocharger comprising:
    a scroll chamber in a turbine casing having an annular flow passage at an inner side of said scroll chamber for passing exhaust gas introduced to said scroll chamber to a radial flow turbine by passing through said annular flow passage, said turbine casing forming a circular wall that forms an inside wall of said scroll chamber, a supporting portion being provided at a stepped part of said turbine casing at an end of said circular wall;
    a plurality of nozzle vanes arranged in said annular flow passage having a variable blade angle;
    a nozzle throat area varying mechanism for varying the blade angle of said plurality of nozzle vanes, said nozzle throat area varying mechanism comprising a nozzle assembly unit which has:
        an annular nozzle mount and an annular nozzle plate rotatably supporting said plurality of nozzle vanes, and
        a plurality of nozzle supports connecting said nozzle mount to said nozzle plate so that said plurality of nozzle vanes are sandwiched between said nozzle mount and said nozzle plate;
    wherein said nozzle assembly unit is detachably attached to said turbine casing;
    wherein said nozzle plate of said nozzle assembly unit is located in said scroll chamber such that said nozzle plate forms an inside sidewall face of said scroll chamber and a wall face of said annular flow passage;
    wherein an inner periphery of said nozzle plate is fit on an outer periphery of said supporting portion provided at said end of said circular wall;
    wherein a circular groove is formed by a side face of said nozzle plate, said outer periphery of said supporting portion and a shoulder face of said stepped part of said turbine casing; and
    wherein a seal member is provided in said circular groove such that said scroll chamber is sealed against gas leakage from said scroll chamber to a point downstream of said annular flow passage.

2. The scroll structure of a variable-throat turbocharger of claim 1, wherein said nozzle plate has a plurality of through-holes that are arranged circumferentially in said nozzle plate and that receive said nozzle supports loosely fitted in said through-holes with a clearance between shaft end parts of said nozzle supports and an inner circumference of said through-holes.

3. The scroll structure of a variable-throat turbocharger of claim 1, wherein said nozzle plate has a peripheral corner that is tapered or rounded toward an entrance of said annular flow passage so as to form a guide portion for smooth entrance of the exhaust gas in said scroll chamber to said annular flow passage.

4. The scroll structure of a variable-throat turbocharger of claim 1, wherein said inside sidewall face of said nozzle plate comprises a rear face facing said scroll chamber that has a curved surface of revolution that continues smoothly to an inside circular surface of said circular wall.

5. The scroll structure of a variable-throat turbocharger of claim 1, wherein said nozzle plate has a peripheral part that is bent such that said wall face of said annular flow passage has a curved surface that smoothly reduces said annular flow passage at an entrance thereof from said scroll chamber to form a guide portion smoothly introducing the exhaust gas from said scroll chamber into said annular flow passage.

6. A method of manufacturing a variable-throat exhaust turbocharger having a scroll chamber in a turbine casing having an annular flow passage at an inner side of said scroll chamber for passing exhaust gas introduced to the scroll chamber to a radial flow turbine by passing through the annular flow passage, the turbine casing forming a circular wall that forms an inside wall of the scroll chamber, a supporting portion being provided at a stepped part of the turbine casing at an end of said circular wall, said method comprising:
    manufacturing a nozzle assembly unit which has an annular nozzle mount and an annular nozzle plate rotatably supporting a plurality of nozzle vanes and a plurality of nozzle supports connecting the nozzle mount to the nozzle plate so that the plurality of nozzle vanes are sandwiched between the nozzle mount and the nozzle plate;
    fitting a seal member to the supporting portion of the circular wall of the turbine casing in order that the scroll chamber can be sealed against gas leakage from the scroll chamber to a point downstream of the annular flow passage; and then
    attaching the nozzle assembly unit to said turbine casing so that the nozzle plate forms an inside sidewall face of the scroll chamber and a wall face of the annular flow passage.

* * * * *